United States Patent

[11] 3,588,039

| [72] | Inventors | Stephen V. Chelminski<br>West Redding;<br>Anthony J. Delano, Westport, Conn. |
|---|---|---|
| [21] | Appl. No. | 855,667 |
| [22] | Filed | Sept. 5, 1969 |
| [45] | Patented | June 28, 1971 |
| [73] | Assignee | Bolt Associates, Inc.<br>Norwalk, Conn. |

[54] SOLENOID VALVE STRUCTURES AND SYSTEMS
28 Claims, 8 Drawing Figs.

[52] U.S. Cl. .................................................. 251/141,
251/129, 339/104, 335/261, 335/278, 335/279
[51] Int. Cl. .................................................. F16k 31/06
[50] Field of Search .......................................... 251/141,
129; 339/104, 103 (M), 103 (R)

[56] References Cited
UNITED STATES PATENTS

| 2,394,103 | 2/1946 | Rader............................ | 251/129X |
| 3,074,685 | 1/1963 | Eckert et al................... | 251/129X |
| 3,116,361 | 12/1963 | Bentz et al..................... | 339/103 |
| 3,241,005 | 3/1966 | Morris, Jr...................... | 251/141X |

*Primary Examiner*—Arnold Rosenthal
*Attorney*—Robertson, Bryan, Parmelee and Johnson ABSTRACT: High performance, reliable solenoid valve structures and systems are described suitable for industrial uses and for use in a corrosive environment to control the flow of high pressure air from an inlet port to an outlet port. These solenoid valve structures are capable of withstanding high vibrational forces and certain embodiments of being submerged in salt water, having an all stainless steel magnetic circuit. The solenoid valve structures include a plunger which together with a valve stem defines the valve, the plunger being selectively shaped to establish excellent pressure balance, for high performance reliability of the magnetic circuit, while the plunger and associated operating parts can be quickly and conveniently disassembled and reassembled without injury to the solenoid valve, to remove dirt particles if any should inadvertently enter through the air line. The solenoid coil and connections may be totally encased. A high strength electrical cable and watertight connection system may be employed with the valve structures adapted to be submerged.

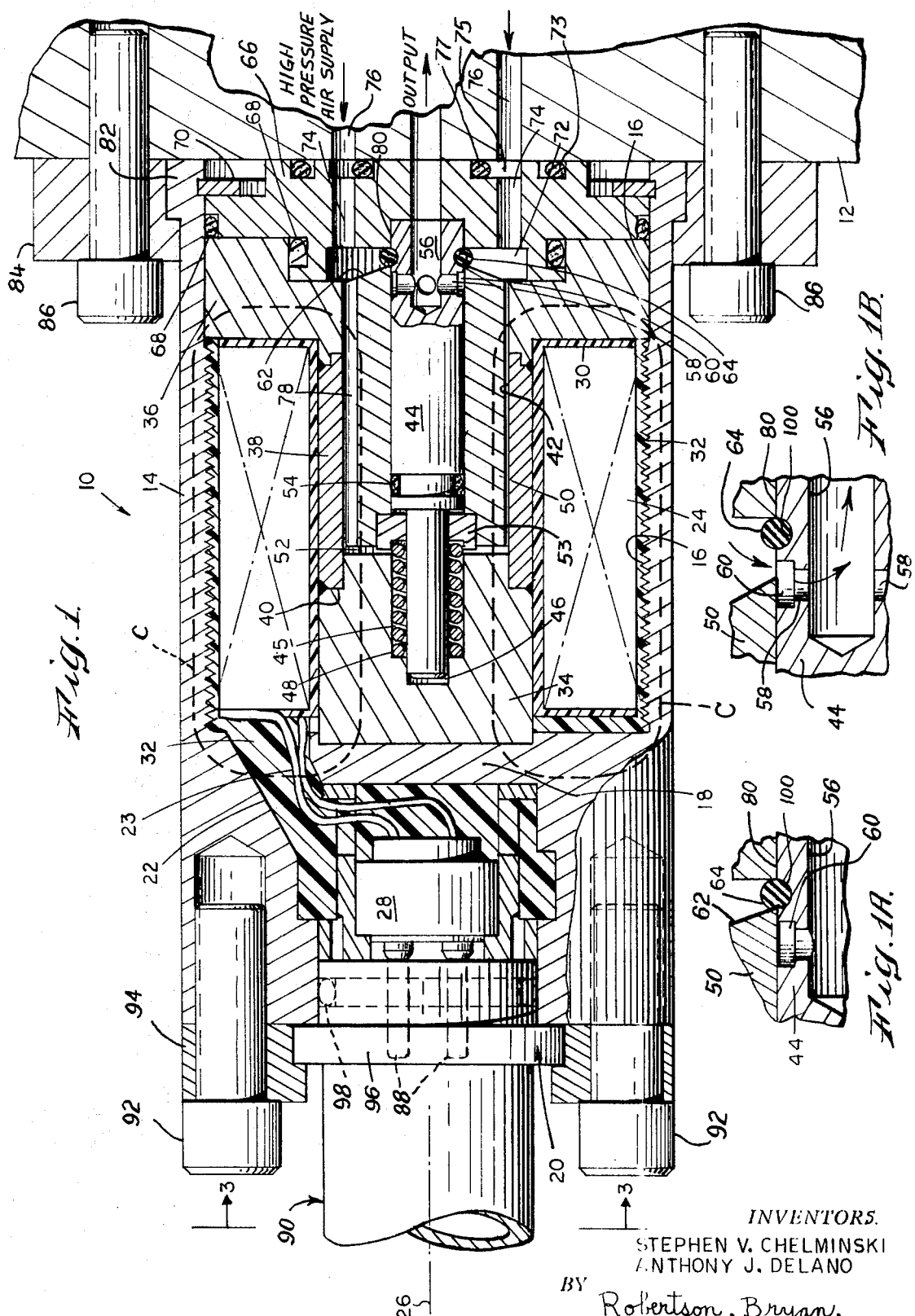

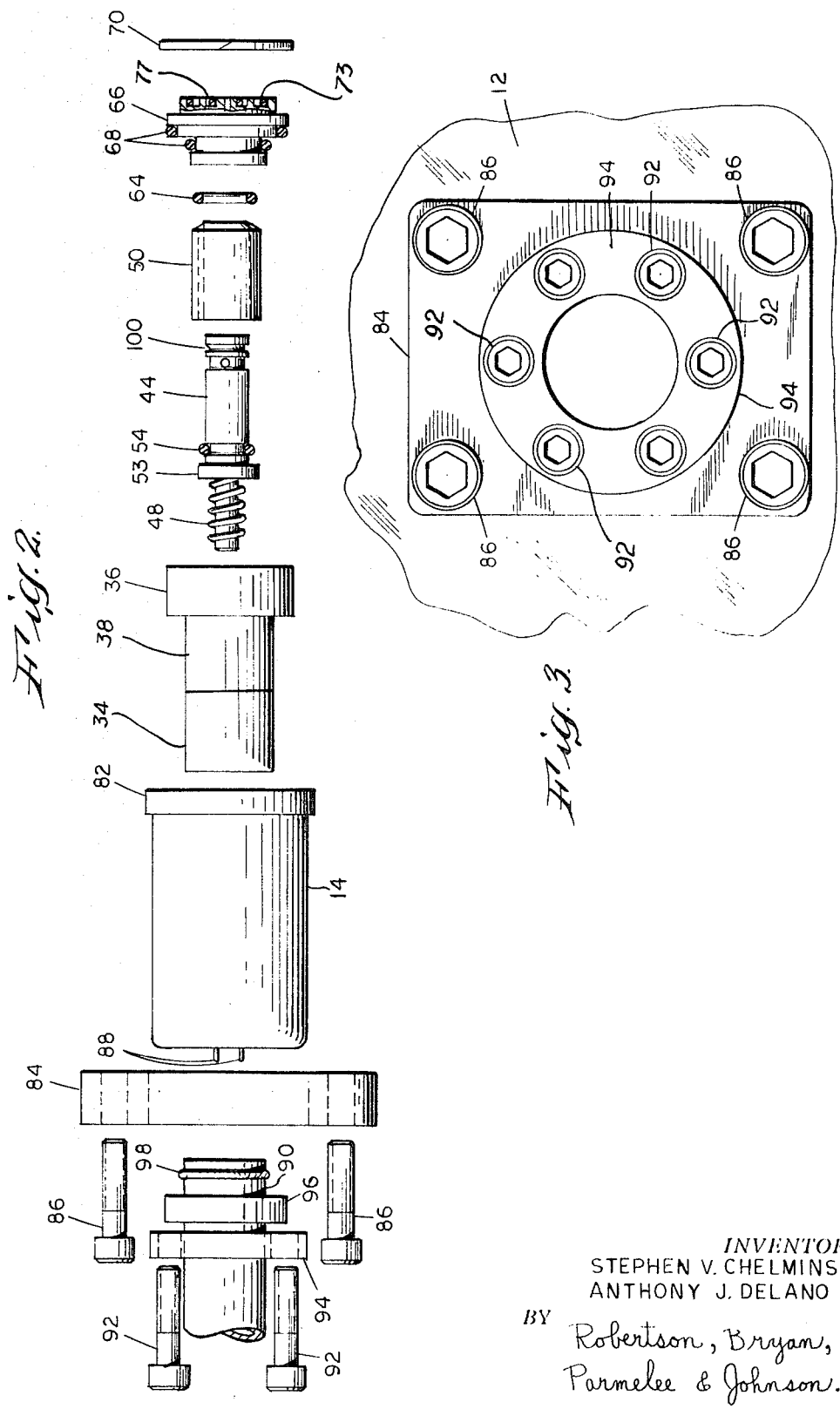

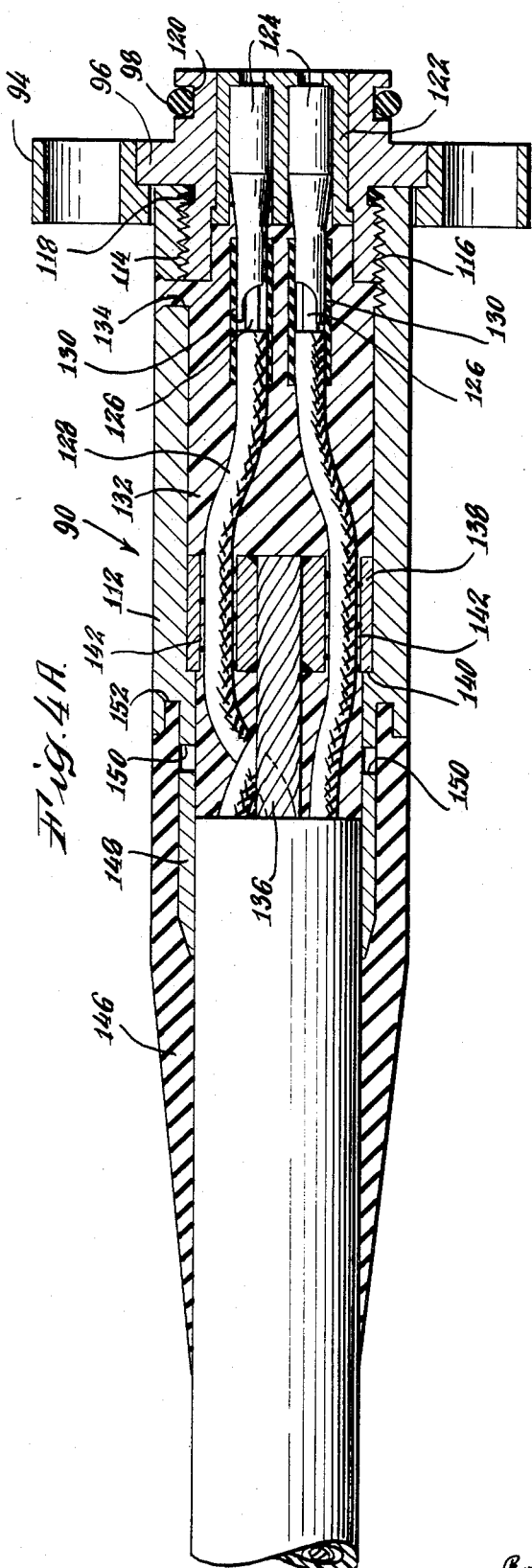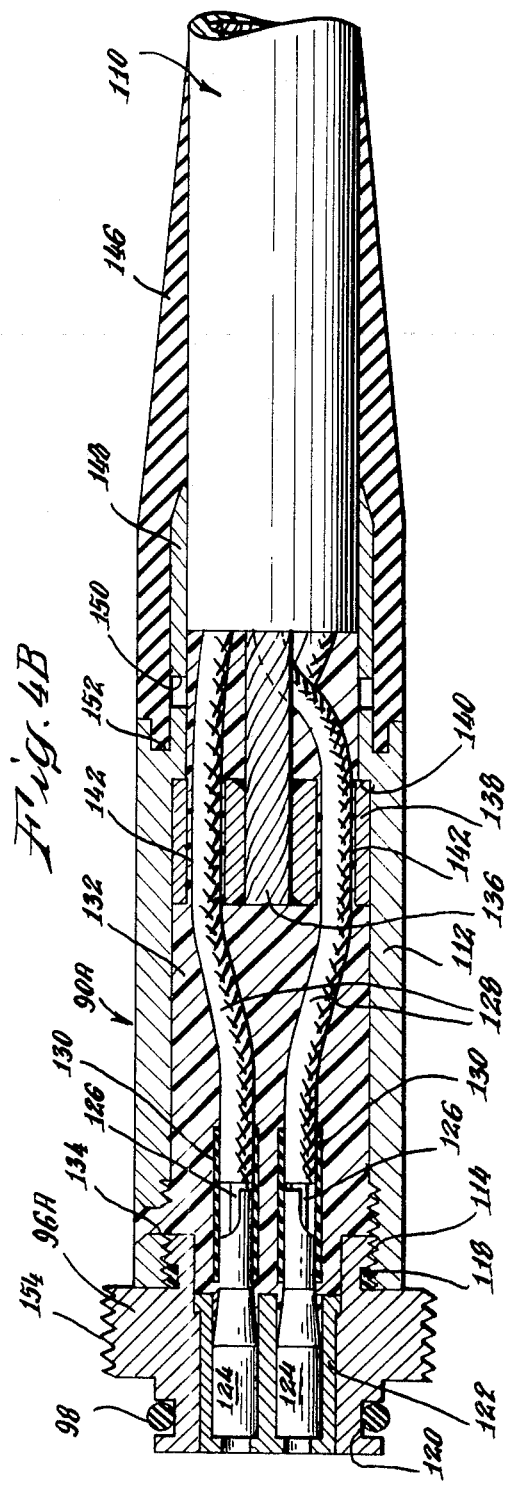

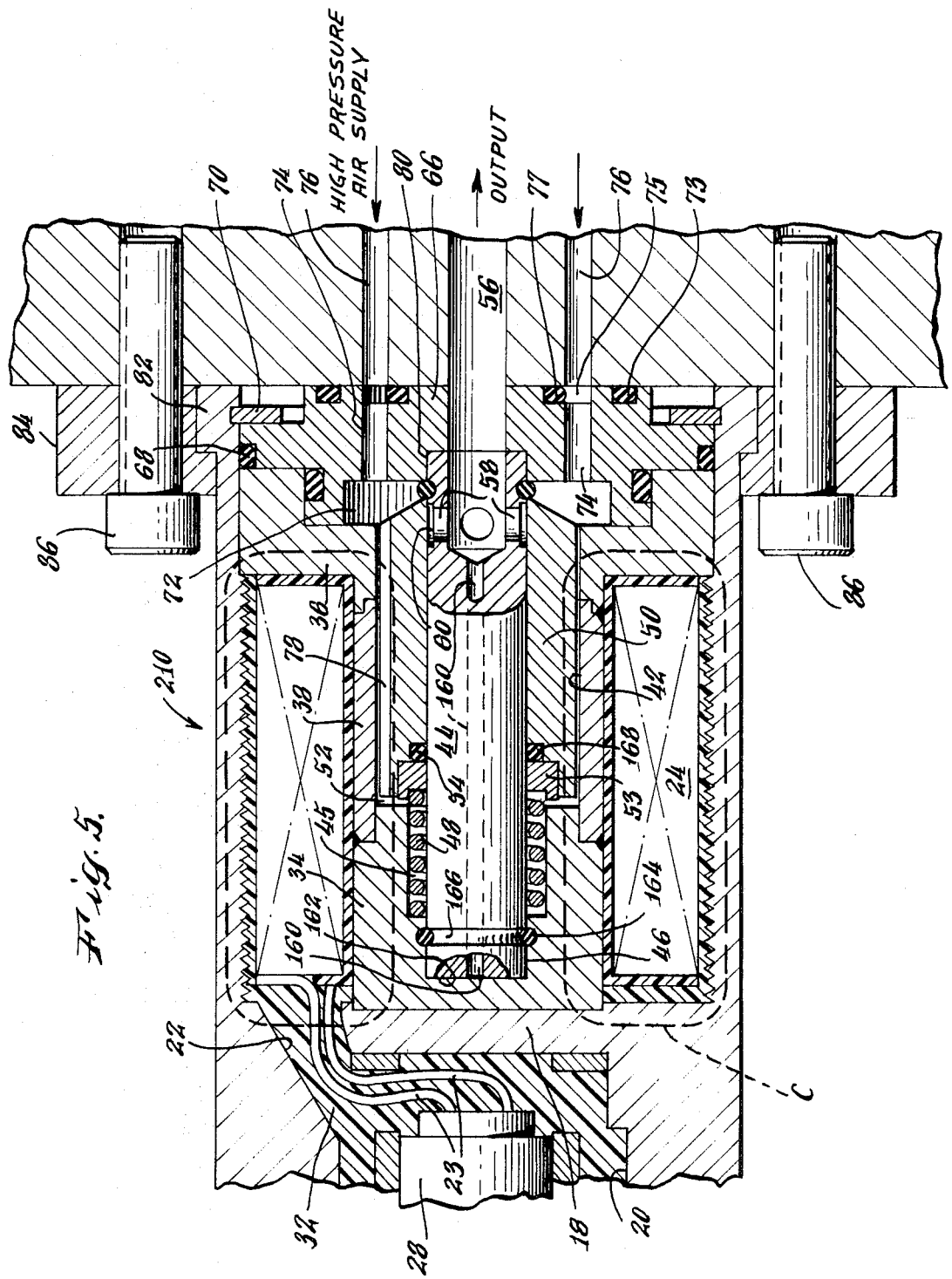

SOLENOID VALVE STRUCTURES AND SYSTEMS

This invention relates to a high performance reliable, and easy-to-service solenoid valve suitable for industrial uses and for use in a corrosive environment. The invention in certain aspects relates to salt water submergible solenoid valves and in other aspects relates to solenoid valves capable of withstanding large vibrational force and in other aspects relates to such valves having a large flow capacity to control the flow of high pressure fluid such as air, from an inlet port to an outlet port.

There are numerous applications where high performance, reliable solenoid valves can be used to advantage. One such application is the surveying of underground strata in exploration for oil or other deposits, in which knowledge of the strata underlying bodies of water is obtained by employing acoustic impulse generating devices actuated under water for creating seismic waves. An effective device, sometimes called an air gun, generates the acoustic impulses by releasing high pressure air or other gases in an abrupt manner and repeating this with short intervals at a selected depth within the body of water. Acoustic impulse generators for this purpose are illustrated in U.S. Pat. No. 3,397,273. The magnitude of the acoustic waves generated may be immense as can be appreciated when one employs air pressures as high as several thousand p.s.i.

The mechanism employed for triggering the release of the high pressure air utilizes a solenoid valve which is remotely controlled from a ship or other surface installation. The solenoid valve in turn controls in a pneumatic manner the abrupt release of air from the air gun. The solenoid valve is directly connected to the submerged air gun and is invariably exposed to the corrosive salt water environment even when precautions are taken to prevent the entry of water into its inner mechanism. For instance, the air supplied to the solenoid valve entrains an amount of ocean moisture particles which are likely to contain corrosive components such as salt thereby contaminating the inner portions of the solenoid valve.

The solenoid valve employs a magnetic circuit which includes a coil and a movable armature in the shape of a plunger which normally seals a valve opening from the high pressure air applied to an inlet port. The plunger is a part of the magnetic circuit so that upon the remotely controlled energization of the coil, the plunger is moved to permit air to flow from the inlet port through the valve opening to an outlet port and thus initiates operation of the air gun.

In an illustrative embodiment the solenoid valve is directly connected to the air gun. It must be extremely rugged in design to withstand the huge vibrations encountered when the air gun abruptly releases its charge of air. For instance, a vibration force or shockwave as high as 200 G is quite commonly encountered. One may, therefore, appreciate that the coil wires as well as the structural features throughout the valve, must be of high performance. Furthermore, in view of the high fluid pressures controlled by the valve, deteriorating effects of the corrosive environment must be carefully controlled to avoid early failure of the device.

Prior art solenoid valves have been unable to meet the severe environmental conditions as described. The wires in some prior art devices will eventually break due to flexing caused by the high vibrational loads. The corrosive effect of the salt water will quickly attack components in prior art valves so that the effective usable lifetime is severely limited. When one considers that during seismic explorations the solenoid valve and associated air gun are actuated at intervals as frequent as once every few seconds or even more often for hours on end when a vessel tows an impulse generator over an area to be explored, then the need for high reliability can be appreciated. Prior art solenoid valves have not been found to operate satisfactorily for such long durations in the described environment.

It is among the objects of the present invention to provide a high performance and reliable solenoid valve for use in a wide variety of demanding industrial applications and capable of handling high pressure fluid, such as compressed air under pressures of thousands of pounds per square inch.

It is another object of this invention to provide a corrosion resistant solenoid valve for controlling the flow of high pressure fluid from an inlet port to an outlet port with high reliability.

It is a further object of this invention to provide a rugged solenoid valve capable of withstanding repetitive high vibrational loads.

It is still a further object of this invention to provide a solenoid valve made of corrosive resistant metal throughout the solenoid valve structure.

It is another object of this invention to provide a precision balanced solenoid valve to control the release of a high pressure fluid in a reliable manner.

Among the advantages of the solenoid valve structures according to this invention are those resulting from the fact that the valves are highly repeatable in operation. The plunger is guided on a centrally located shaft, and thus the plunger does not rub against the plunger housing, thereby avoiding variable frictional effects and also avoiding variations in magnetic forces acting on the plunger. During each sequence of operation the valve accurately repeats its previous sequences of operation.

Additional advantages of this invention result from the fact that the solenoid valve structures are capable of withstanding large acceleration forces, i.e. large G forces. They are adaptable for uses in various environments where corrosive agents are present.

These objects, features and advantages will become more fully understood upon a review of the following description of various embodiments of the invention, wherein:

FIG. 1 is an axial sectional view of a solenoid valve embodying the invention;

FIG. 1A and 1B are partial sectional views showing the seal and plunger on enlarged scale;

FIG. 2 is an exploded view of the components used in the embodiment of FIG. 1, shown on reduced scale;

FIG. 3 is a view of the solenoid valve in FIG. 1 taken along the line 3–3 in FIG. 1;

FIG. 4A is an axial sectional view of a watertight connector and high tensile strength submergible electrical cable system adapted for connection to the solenoid valve structure of FIGS. 1–3;

FIG. 4B is an axial sectional view of the opposite end of the cable for connection on shipboard;

FIG. 5 is an axial sectional view of a high performance reliable solenoid valve capable of handling extremely high pressure fluids.

Briefly stated, in one of its aspects the invention contemplates a solenoid valve of a corrosion resistant metal, preferably stainless steel, which together with rugged encapsulation of the solenoid coil and electric wires provides a reliable solenoid valve which may be submerged within a salt water environment without fear of performance degradation. Another feature contemplated by the solenoid valve in accordance with my invention provides an accurate pressure balancing of the armature or plunger employed and provides a valve structure capable of withstanding large G forces. This balancing is accomplished by carefully controlling the design of the sealing location of the plunger. Advantageously, the solenoid coil and connections are totally encased; the plunger and associated operating parts can be quickly and conveniently disassembled and reassembled without injury to the solenoid valve if it should be desired to remove dirt particles, if any should inadvertently enter the air supply line.

With reference to FIG. 1, there is shown a solenoid valve 10 mounted upon an air gun 12. The air gun 12 is provided with suitable ports for providing air to the solenoid valve and to receive the triggering air flow when the valve is actuated. Air is supplied to the air gun 12 from a surface source not shown in FIG. 1. The air gun does not form a part of the invention and therefore only the end portion is illustrated. The valve is enclosed within a generally cylindrical stainless steel outer housing 14. The housing 14 is provided with a valve bore 16 extending from one end opposite the air gun 12 and terminates at an apertured wall 18 separating the valve bore 16 from a connector bore 20. An aperture 22 in the wall 18 permits electric wiring 23 to communicate with the valve bore 16 from the connector bore 20.

Within the valve bore 16 is a corrosion resistant metal encased solenoid coil 24. The coil 24 is annular and includes electric windings wound on a bobbin 30 of insulating material to provide a magnetic field directed along the valve bore axis 26 upon the application of an electric current to the wires through a connector 28 in the connector bore 20. The bobbin 30 is a U-shaped annular nylon sheath, and the electric windings on the bobbin are enclosed by an encapsulating material 32, such as epoxy encapsulant. The encapsulating material 32 is also used to encapsulate the wires 23 between the connector 28 and the coil 24 throughout the aperture and passage 22. The connector 28 is made of a strong dielectric material capable of withstanding high axially directed forces.

The wiring 23 as well as that within the bobbin 30 is fully encapsulated. In fact, the bobbin is affixed to the wall of the valve bore 16 by use of the encapsulating material to provide excellent protection against a salt-laden corrosive environment. The complete encapsulation further inhibits wire flexing under vibrational loads when the air gun 12 is to be operated.

To provide a very strong mounting for the solenoid coil, for resisting the extremely great acceleration forces, i.e. mechanical shocks, encountered, the inner wall of the housing 14 is roughened to provide a strong mechanical grip, for example, as shown the inner wall is threaded by a very fine threading in the region extending the length of the coil. In this example the threads are 0.010 of an inch deep at 24 threads per inch. Thus, the epoxy encapsulant obtains a strong mechanical bond to the wall of the housing to resist shear stresses and to provide a watertight seal.

The bobbin 30 is annular shaped and includes a bobbin bore into which a valve assembly is placed in close magnetic coupling relationship with the sheath 30. The valve assembly includes a valve housing preassembly formed of a first magnetic pole piece 34 made of magnetically permeable stainless steel and a second annular shaped magnetic pole piece 36 also made of magnetically permeable stainless steel and located near opposite axial ends of the bobbin 24 respectively. An annular nonmagnetic spacer 38 is employed between the first and second magnetic pole pieces 34—36. The spacer 38 seats on to an annular shoulder 40 on the pole piece 34, and the spacer is preferably made of nonmagnetic stainless steel. These three pieces 34, 36 and 38 of the valve housing are heliarc welded together to form a rugged integral structure.

The valve housing assembly defines an inner valve assembly bore 42 selectively shaped to concentrically retain a nonmagnetic generally cylindrical inner valve stem 44 made of a non-corrosive material such as beryllium bronze. The first pole piece 34 is provided with a spring retaining bore 45 and a valve stem retaining counter bore so that an annular compressible spring 48 may fit in coaxial relationship with the stem 44 with both the spring 48 and the valve stem 44 seated on the bottoms of bores 45 and 46 respectively.

A hollow cylindrical magnetic plunger 50 made of magnetically permeable stainless steel is shown coaxially and slidably mounted with the valve stem 44 and in compressive relationship with the spring 44 by use of a retainer ring 53 mounted in a counter bore of the plunger 50. The plunger 50 is slightly axially spaced from the first pole piece to form an annular air gap 52. The plunger 50 has an axial length sufficient for radial magnetic coupling with the second annular magnetic pole piece 36. An annular sliding seal 54 is provided between the stem and the plunger by use of a conventional groove in the stem 44 and O-ring in the groove.

The axial end of the valve stem near the open end of the valve bore 16 is enlarged in diameter in comparison with the portion sized to fit within the bore 46 in the first pole piece 34.

The enlarged section of the valve stem is provided at its axial end with centrally located fluid outlet passage 56 which communicates through radially extending ports, illustratively shown as four ports 58, with an annular outlet groove 60 cut into the surface of the stem 44. The plunger 50 is shown provided with an annular chamfered edge or end surface 62 (FIGS. 1A and 1B) which terminates in a sharp annular lip line adjacent the valve stem 44 and in sealing relationship with an opening seal 64.

An annular retainer end plate 66 is provided which is mounted in sealing relationship with the open end of the valve bore 16 by means of peripheral O-ring seals 68. The annular plate is retained in the outer housing 14 by a suitable snap retainer ring 70 sized to fit within an annular groove formed in the wall of the valve bore 16 so that the retainer plate 66 forms the end of the housing 14 and holds the valve stem fixed in position. The retainer plate 66, the opening seal 64, and the chamfered end surface form an annular inlet chamber 72. This inlet chamber 72 communicates through a plurality of distributed inlet passages 74, formed in the end plate 66, with an annular inlet channel 75 formed in the outer surface of the end plate 66. This inlet channel 75 directly communicates with air supply passages 76 in the air gun 12.

It is an advantage of the inlet channel 75 that it enables the inlet passage 74 to communicate with the supply passage 76 regardless of the particular angular position of the solenoid valve with respect to its own axis. Moreover, when the valve suddenly opens, a large flow capacity is provided by the arrangement of the inlet channel 75, inlet passage 74, inlet chamber 72, seal 64, outlet groove 60, multiple outlet ports 58 and central outlet passage 56. A pair of O-rings 73 and 77 seal the inlet channel 75, the seal 73 being in a separate concentric groove.

The inlet chamber 72 further communicates through a pressure equalization groove 78 in the outer surface of the plunger 50 with the air gap 52 located at the other axial end of the plunger. The opening seal 64 is so located and sized that as shown in the FIGS. 1 and 1A it seals both the annular seam between the plunger 50 and the valve stem 44 as well as the seam 80 between the valve stem 44 and the wall of a valve stem receiving bore in the retainer end plate 66.

It is an advantage of this solenoid valve that the plunger 50 is very precisely balanced with respect to the high pressure air in the inlet chamber 72 so that no significant net axial thrust exists. Thus, there is very little force to be overcome by the magnetic attraction and hence the valve opens quickly and easily. Also this precision balancing enables a small weak spring 48 to be used, which also facilitates easy reliable opening of the valve in spite of the high pressure air being controlled. The way in which this precision balancing is provided is to assure that the net area of the plunger end surface 62 exposed to the high pressure air equals the area of the other end surface of the plunger near the air gap 52.

The retainer 53 is made of corrosion resistant nonmagnetic material. It protrudes slightly beyond the end of the plunger 53, and thus it serves as a spacer to prevent the plunger 50 from coming into contact with the pole piece 34. This avoids any tendency for the plunger to be magnetically retained in its "open" position. Accordingly, the valve reliably closes when the electrical current flow is discontinued.

It is to be understood that the opening seal 64 will be deformed by the high pressure which may be as high as several thousands of pounds per square inch present in the inlet chamber 72. Accordingly, the amount of deformation will affect the net force applied by the high pressure in the annular chamber 72 onto the end surface 62 of the plunger 50. Although axial pressure balance of the plunger is primarily established by the employment of the groove 78 one may appreciate that a small covering of the end surface 62 by deformation of the opening seal 64 will affect the axial pressure balance, depending upon the force exerted by the deformed seal 64.

For illustration, if the opening seal should cover 1 percent of the surface area, then for a 2,000 p.s.i. inlet pressure, a substantial differential in pressure effects may arise and be opposed by the force exerted by the deformed seal. The resultant imbalance during operation must be overcome by the magnetic circuit during actuation and imposes a burden on the magnetic circuit. However, by the advantageous employment of an annular chamfered end surface 62 which terminates at the valve stem with minimum coverage by the seal 64 providing a well-defined lip line as shown in FIG. 1A, the imbalance has been markedly reduced to an insignificant level well within the capability of the magnetic circuit used in the embodiment.

The fixed-position central stem shaft 44 serves to guide the plunger 50 to prevent this plunger from rubbing against the surrounding members 38 and 36. Thus, variations in friction force and variations in magnetic forces are avoided with consequent increase in reliability and repeatability in operation.

In the operation of the solenoid valve 10, the energization of the coil 24 produces an axially oriented magnetic field in a magnetic circuit "C" which is provided as follows: the magnetic field passes through the first pole piece 34, across the air gap 52 and through the plunger 50 to the second pole piece 36; the return path for the magnetic field is from the pole piece 36 into the stainless steel housing 14 passing around the coil and through the wall 18 back into the first pole piece 34. The housing 14 is formed of magnetically permeable stainless, and it was previously explained that the pole pieces 34 and 36 and the plunger 50 are all of magnetically permeable stainless. Thus, the entire magnetic circuit is defined by noncorrosive permeable materials.

Upon energization, the plunger 50 is thereupon attracted by the first pole piece 34 and slides across the sliding seal 54, to suddenly open the outlet groove 60 to the inlet chamber 72 to allow high pressure air to pass to the outlet port 56. As described above, the protruding retainer 53 acts as a spacer stop to maintain a small space between plunger 50 and pole piece 34. The magnetic attraction between pole 34 and plunger 50 acts against the force of the spring 48, and upon the removal of the magnetic field this spring forces the plunger 50 to return into sealing engagement with the opening seal 64.

Although the solenoid valve 10 in this embodiment employs stainless steel within its magnetic circuit the components of the magnetic circuit are made of the configuration as shown so that the reluctance of the magnetic path is sufficiently low to compensate for any magnetic field losses.

With reference to FIG. 2, there is shown the solenoid valve according to this invention in exploded form to illustrate the ease with which this valve may be assembled. The outer housing 14 is provided at the open end of the valve bore 16 with an annular radially outwardly extending shoulder 82 for receiving a housing mounting flange retainer 84 for mounting of the valve 10 to the air gun body 12 by suitable screws 86. The outer housing 14, as shown in FIG. 2 has already been provided with the coil 24 which is in watertight and mechanical shock resistant tight sealing relationship with the wall of the valve bore by the employment of the fine screw threads and encapsulating material as described. The electrical contact pins 88 of the male connector 28 are shown projecting from the outer housing 14, and mate with a cable connector 90 held to the outer housing by suitable screws 92 and a connector retainer ring 94, which seats on an annular shoulder 96 on the cable connector 90. The cable connector is provided with an annular watertight seal 98 that engages the wall of the connector bore 20 to prevent the environment from reaching the inside of the connector. FIG. 3 illustrates the endview when the valve is mounted upon the end of an air gun body 12, which is partially shown.

The integral plunger housing formed by the first and second magnetically permeable corrosion resistant pole pieces 34-—36 welded to the nonmagnetic corrosion resistant member 38 are first inserted into the valve bore and subsequently followed by the valve stem 44 and spring 48 together with the sliding seal 54 and spring retainer ring 53. Thereupon the plunger 50 is placed over the stem 44 to come to rest against the spring retainer and magnetic spacer ring 53. After insertion of the plunger 50, the opening seal 64 is added to the valve stem at its groove position over opening seal groove 100 formed in the valve stem 44. Thereupon the end plate 66 together with its seals 68, 73 and 77 is added in concentric relationship with the stem, and is secured in place by the snap ring 70.

As shown in FIGS. 4A and 4B, the high tensile strength electrical cable and connector system includes the connector 90 integrally attached to the cable 110. The connector 90 includes a stainless steel sleeve body 112 which is screwed at 114 onto an end piece 116 having the external flange 96. The screw connection 114 includes a sealant 118 adjacent to the flange 96. The O-ring seal 98 fits in a groove 120 around the projecting portion of the connection end piece 116.

Within the end piece 116 is an electrical socket member 122 holding a pair of contact sockets 124 to which the wires 126 of the insulated electrical conductors 128 are attached as by soldering. An insulating bushing 130 surrounds each electrical connection, and encapsulating material 132 fills the interior of the body 112, this material being fed into the connector assembly through an opening 134 in the sleeve body 112.

To enable the cable and connector system 90—110 to withstand large tensile stresses, of the order of 2,000 pounds, the electrical cable 110 contains a central flexible stranded steel cable 136. The end of this tensile cable 136 is mechanically fastened, as by silver solder, to an anchor plug 138 which abuts against an internal shoulder 140 in the body 112. The insulated conductors 128 extend through passages 142 in the anchor plug 138.

The electrical cable 110 is sheathed in rubber, and the insulated conductors 128 are helically wound around the tensile cable core 136. Although only two wires 126 are required, there may be four insulated conductors 128 within the cable 110, these being paired together in parallel relationship when connecting to the respective contact sockets 124. This pairing of the conductors provides increased reliability, for if one of either pair happened to part, the other would still operate the solenoid valve.

A tapered rubber sleeve 146 is molded over the cable 110 and is molded over a reduced diameter extending end portion 148 of the connector body 112. The molded material can enter through openings 150 to fill the interior of the connector portion 148. A recess 152 mates with the molded rubber part 146.

The other end of the cable 110 is shown in FIG. 4B, and it includes a connector 90A which is similar in all respects to the connector 90, except that the connector 90A has an external flange 96A which is threaded at 154 to provide a screw connection to control equipment on board the survey vessel.

FIG. 5 shows a solenoid valve 210 capable of handling extremely high pressure fluid and which is similar in many respects to the valve 10, and therefore only the differences will be described in detail. Those parts in the valve 210 which perform functions corresponding to those of the respective parts in the valve 10 have corresponding reference numbers.

The valve 210 is capable of being used with very high pressure compressed fluids, for example such as those having a pressure of the order of 20,000 pounds per square inch or even more. It can also be used to handle lower pressure fluids.

The valve stem 44 is of uniform diameter throughout its length, and it has an axial passage 160 extending between the output passage 56 and the opposite end 162 of the fixed-position stem 44. Thus, the end surface 162 of the stem 44 is subjected to the same pressure as that which exists in the output passage 56. An O-ring seal 164 in a groove 166 surrounds the valve stem 44 near the end 162 for isolating the end surface 162 from the high pressure fluid which from an annular inlet chamber 72 seeps through the pressure equalization groove 78 into the bore 45 which contains the spring 48.

Thus, advantageously the valve stem 44 in the valve 210 is isolated from the immense compressive loading which would otherwise be imposed in an axial direction if the extremely high pressure fluid could reach the end surface 162.

Moreover, the outlet port passage 56 and the radially extending ports 58 and the annular outlet groove 60 are all consequently enabled to be enlarged in proportion to the size of the stem 44, thereby providing a greatly increased flow capacity as compared with the relative size of the valve 210.

It is noted that in the valve 210 the O-ring seal 54 fits in a recess 168 in the plunger 50 beneath the retainer stop 53, rather than fitting in a groove in the valve stem as done in the valve 10.

The valve 210 is mounted on an industrial device 212 which can utilize a sudden flow of very high pressure fluid, such as a forging tool, crimping tool, etc.

When the valves 10 or 210 are to be used in less corrosive industrial environments, the various parts can be made of steel rather than stainless steel.

Having thus described solenoid valve structures and systems in accordance with the invention, their several advantages become readily apparent. The valves are capable of providing a large outflow of controlled fluid by the employment of an annular outlet groove 60 in direct communication with the annular inlet chamber 72 and by using multiple outlet ports in communication with the annular outlet groove 60. Each of the magnetic components employed may be made of stainless steel, and the valve stem is made of beryllium bronze, with both materials selected to provide strong corrosion resistance. None of the metal components need to be plated, thus permitting accurate alignment. The excellent pressure balance established across the plunger assures that the magnetic circuit will be able to move the plunger quickly and reliably. Furthermore, the ability to encapsulate the coil windings with strong close adherence to the wall of the valve bore, further protects the coil from corrosion, providing reliable operation. The advantage of having the inlet and outlet ports all commencing in a planar relationship at the end of the retainer plate enhances the ease of mounting the solenoid valve upon a utilization device, such as the air gun, and reduces the criticality in the mounting of the valve to the body. With the structures as described huge vibrational loads may be applied repetitively, and for long durations without wire breakage or deterioration of moving parts. The moving parts are readily removable and reassembled. Concentricity is maintained, avoiding rubbing of the plunger against the surrounding members 38 and 36 and avoiding variations in magnetic effects, thus assuring reliability and repeatability.

We claim:

1. A solenoid operated valve for use in controlling high pressure fluid in a corrosive environment to control the flow of the pressurized fluid supplied from an inlet port to be abruptly released through an outlet port comprising:

an outer housing made of magnetically permeable stainless steel and having a bore;

a solenoid winding mounted within the bore of the housing for producing a magnetic field, said winding being bonded with the wall of said bore in watertight relationship;

means including a slidably mounted plunger of magnetically permeable stainless steel, a seal engageable by said plunger for blocking flow between the inlet port and outlet port;

a pole piece assembly of magnetically permeable stainless steel mounted within said housing near said plunger and defining therewith an air gap to receive the sliding plunger in response to generation of a magnetic field by said winding; and the magnetic circuit for said plunger being comprised entirely of magnetically permeable stainless steel except for said air gap and including said housing, pole piece assembly and plunger, and pole piece assembly being removable from said housing for servicing, while said solenoid winding remains bonded to the wall of the housing in watertight relationship.

2. A solenoid operated valve for use in controlling high pressure fluid in a corrosive environment as claimed in claim 1 in which said pole piece assembly includes a pair of pole pieces of magnetically permeable stainless steel with an annular member therebetween of nonmagnetic stainless, said pole pieces being welded to said annular member to form an integral plunger housing structure, one of said pole pieces surrounding said plunger and the other being spaced from an end of said plunger to define said air gap.

3. The solenoid valve as recited in claim 1 which further includes:

a valve stem having an outlet passage located therein to sharply define a valve opening; and said seal being mounted on the valve stem adjacent to said valve opening to normally seal the valve opening when said seal is engaged by the plunger.

4. The solenoid valve as recited in claim 3 wherein said valve stem is fixedly mounted relative to the outer housing.

5. The solenoid valve as recited in claim 4 wherein the valve stem is;

concentrically located with the plunger and provided with an annular groove in communication with the outlet passage in said stem to define an annular valve opening.

6. The solenoid valve as recited in claim 3 in which:

a retainer end plate is sized to fit within the outer housing; and said retainer end plate being provided with inlet and outlet passages terminating in a common surface for respective planar communication between the valve opening and the inlet and outlet ports.

7. The solenoid valve as recited in claim 1 and further including:

a connector bore in axial alignment with the valve bore and having an aperture in the bore bottom for electrical communication with the solenoid winding; and a connector and electrical wires encapsulated within the connector bore and said wires extending through said aperture and being encapsulated within said aperture to energize the winding in a vibration resistant manner.

8. The solenoid valve as recited in claim 1 wherein said solenoid winding is wound on a corrosive resistant bobbin arranged to produce an axial magnetic field with the bobbin and winding being encapsulated and bonded to the inner wall of the outer housing.

9. A solenoid operated valve for use in a corrosive environment to control the flow of pressurized fluid applied to an inlet port to be controllably released through an outlet port comprising:

an outer housing formed of a corrosive resistant material and having a valve bore extending from one end surface along an axis and having a connector bore extending from the other end surface along said axis and in communication with the valve bore through a passageway;

a bobbin formed of a corrosive resistant material, said bobbin being mounted in sealed relationship with the wall of the valve bore and provided with a bore in alignment with the valve bore axis;

said bobbin being provided with an electrical winding encapsulated therein with the winding arranged to generate an axially oriented magnetic field in response to current supplied through the winding;

an electrical connector mounted in the connector bore;

said connector being electrically coupled to said bobbin winding through said passageway for electrically energizing said bobbin winding;

a valve assembly mounted within the bobbin bore along the axis, said valve assembly including a nonmagnetic fixedly-mounted inner valve stem of corrosion resistant material and a movable plunger surrounding said stem formed of a corrosion resistant magnetically permeable material;

said plunger having a through bore for slidable mounting around the valve stem and having an axial length selected to provide limited axial sliding movement;

a magnetically permeable pole piece of corrosion resistant material positioned in said magnetic field;

said plunger normally being spaced from said pole piece by a gap;

said plunger providing a sufficiently low magnetic reluctance path to couple with the magnetic field through said gap;

said valve stem having an outlet passage therein;

a seal extending around said valve stem;

means for normally urging the plunger in sealed relationship with said seal for sealing the outlet passage;

an end plate formed of a corrosion resistant material located in the opening of the valve bore and provided with inlet and outlet apertures, said outlet aperture being in alignment with the outlet passage in said valve stem; and said end plate and said plunger in the vicinity of said seal defining an annular inlet chamber communicating with said inlet aperture in the end plate.

10. A solenoid operated valve as claimed in claim 9 in which said valve stem has a plurality of outlet ports adjacent to said seal, said plunger blocking said ports when the plunger is in contact with said seal.

11. The solenoid operated valve as claimed in claim 9 and further including a valve housing assembly sized to fit within the bobbin bore, said valve housing assembly including said pole piece formed of corrosion resistant material and located near the bottom of the valve bore in magnetic coupling relationship with the bobbin and axially spaced from the plunger by the gap, a second annular magnetically permeable pole piece formed of a corrosion resistant material and located near the other axial end of the bobbin to radially couple the magnetic field from the bobbin to the plunger, with an annular member of corrosion resistant nonmagnetic material positioned between said pole pieces and integrally attached to them.

12. The solenoid valve as claimed in claim 9, in which:

said plunger has a passage providing communication between the gap with the annular inlet chamber for pressure balance of the plunger; and said plunger further having a chamfered edge in minimum area contact with the seal to further enhance the pressure balance of the plunger.

13. A solenoid operated valve for controlling fluid flow comprising:

a solenoid coil extending around an axis for generating a magnetic field when said solenoid coil is energized by an electrical current;

a valve stem positioned along the axis of said coil;

means holding said valve stem fixed in position;

said valve stem having a passage extending axially therein;

said valve stem having at least one radial port therein communicating with said passage;

an annular plunger slidably mounted on said valve stem, said plunger extending into said solenoid coil;

spring means normally urging said plunger to block said radial port; and said solenoid coil when energized moving said plunger to open said port for allowing fluid flow through said passage.

14. A solenoid operated valve as claimed in claim 13, including a removable plunger housing, said removable plunger housing comprising:

a first pole piece of magnetically permeable material;

a second pole piece of magnetically permeable material;

an intermediate member positioned between said pole pieces and attached to both of said pole pieces;

said removable plunger housing being sized to receive said plunger and valve stem therein and being sized to fit removably within said solenoid coil; and said valve stem serving to guide said plunger to maintain said plunger concentrically located to prevent said plunger from touching the inner wall of said plunger housing.

15. A solenoid controlled valve as claimed in claim 14 in which said first pole piece has a recess therein for receiving and holding an end of said valve stem.

16. A solenoid controlled valve as claimed in claim 15, in which said valve stem has a passage extending therein from said fluid flow passage to said end of said valve stem for maintaining a pressure at said end corresponding substantially to the pressure in said fluid flow passage.

17. A high-capacity flow solenoid controlled valve for suddenly releasing high pressure fluid and adapted for repeated, reliable performance while submerged in water over long periods of time comprising:

a housing having a valve stem mounted within the housing and extending along the axis of the housing;

said valve stem being formed of corrosion resisting nonmagnetic material and having an axial discharge passage extending axially therein toward an end of the housing;

a seal surrounding said valve stem;

said valve stem having an annular outlet groove surrounding said valve stem adjacent to said seal;

said valve stem having a plurality of outlet ports therein connecting said axial discharge passage with said outlet groove;

an annular plunger surrounding said valve stem, said plunger being formed of magnetically permeable noncorrosive material, said plunger being slidable along said valve stem toward and away from said seal;

spring means urging said plunger toward said seal to move a first axial end of said plunger against said seal; and said housing having an inlet passage communicating with an annular inlet chamber surrounding said valve stem adjacent to said seal for admitting high pressure fluid through said inlet passage into said inlet chamber, said housing having a solenoid winding, and a magnetically permeable member spaced from the end of said plunger opposite to said seal for attracting said plunger upon energization of said winding to open said valve.

18. A high-capacity solenoid controlled valve for suddenly releasing the flow of high pressure fluid as claimed in claim 17 in which said first axial end of said plunger which engages said seal is chamfered to slope away from said seal providing a sharply defined lip line adjacent to said stem for engaging said seal.

19. A high-capacity solenoid controlled valve for suddenly releasing the flow of high pressure fluid as claimed in claim 17 in which:

said housing has an outlet passage at said end of the housing toward which said discharge passage in said valve stem extends;

said housing having an inlet channel concentrically surrounding said outlet passage and spaced therefrom, said inlet passage communication with said inlet channel; and seal means for sealing said channel from the environment.

20. A high capacity flow solenoid operated valve for suddenly releasing high pressure fluid and adapted for repeated reliable performance over long periods of time comprising:

a housing having a valve stem mounted within the housing and extending along the axis of the housing;

said valve stem being formed of nonmagnetic material and having an output passage extending axially therein toward an end of the housing and at least one discharge port communicating with said output passage and radially extending to the exterior of the valve stem;

a seal surrounding said valve stem;

an annular plunger surrounding said valve stem, said plunger being formed of magnetically permeable material, said plunger being slidable along said valve stem toward and away from said seal;

a first axial end of the plunger and the housing defining an inlet chamber adjacent to said seal, said housing having an inlet passage communicating with said inlet chamber for admitting high pressure fluid through said inlet passage into said inlet chamber;

said valve also admitting high pressure fluid into communication with a second axial end of the plunger for pressure balancing of the plunger;

spring means urging said plunger toward said seal to move the first axial end of said plunger against said seal;

said plunger when engaging said seal separating said inlet chamber from said discharge port; and a solenoid coil within said housing for moving said plunger away from said seal to open said discharge port when said solenoid coil is energized by an electrical current for releasing high pressure fluid through said output passage.

21. A high capacity flow solenoid operated valve as claimed in claim 20 in which said inlet passage extends to the same end of the housing as said output passage.

22. A high capacity flow solenoid operated valve as claimed in claim 21 in which said output passage is axially located at said end of the housing, said end of the housing having an annular inlet channel therein concentric with said output passage, said annular inlet channel communicating with said inlet passage.

23. A high capacity flow solenoid operated valve as claimed in claim 20, said valve being adapted to handle very high pressure fluids and in which, said valve stem has a passage therein extending from said output passage to the end surface of said valve stem, and seal means surrounding said valve stem for isolating said end surface from the high pressure fluid which is in communication with said second axial end of said plunger, for isolating said valve stem from axial compressive loading, whereby said valve is capable of handling fluids which are at very high pressures.

24. A solenoid operated valve for use in controlling high pressure fluid to a utilization device in a corrosive environment to control the flow of the pressurized fluid supplied to an inlet port to be abruptly released through an outlet port comprising:

a housing formed of a corrosion resistant material and having a valve bore extending from one end surface along an axis and having a connector bore in general alignment with the valve bore axis and in communication with the valve bore along an interconnecting passageway;

an end plate mounted to the housing, said end plate having axially aligned inlet and outlet passages commencing in an outer axial end surface of the housing in registration with the inlet and outlet ports respectively;

a solenoid winding secured in sealed relationship with the wall of the valve bore and provided with a bore in alignment with the valve bore axis, said solenoid winding providing an axially oriented magnetic field in response to current flowing in the winding;

magnetically permeable material defining a magnetic circuit for the axial magnetic field generated by the solenoid winding, said magnetic circuit including a valve assembly operatively interposed between the inlet and outlet ports;

a connector plug mounted in the connector bore and electrically coupled to the solenoid winding through said interconnecting passageway;

a mating connector coupled to a conductor cable and connected to the plug in sealed relationship with the housing; and a high strength connector mounting flange to axially retain the mating connector in operative engagement with the connector plug through repeated abrupt releases of high pressure fluid.

25. The solenoid controlled valve as recited in claim 24 wherein the valve bore wall for an axial length thereof is provided with a roughened surface and wherein said solenoid winding outer surface is bonded with said roughened surface for strong mechanical engagement with the valve bore wall to mount the solenoid winding with high axial retention strength in the valve bore.

26. The solenoid controlled valve as recited in claim 24 wherein the housing at said end surface is provided with radially extending shoulder, an apertured housing mounting flange having an aperture sized to fit the flange over the housing and further sized to seat upon the housing shoulder and mount the solenoid valve with high strength to the high pressure fluid utilization device.

27. A solenoid controlled valve for use in controlling high pressure fluid in a corrosive environment to control the flow of the pressurized fluid supplied to an inlet port to be abruptly released through an outlet port comprising:

a housing formed of a corrosion resistant material and having a removably mounted end plate located at an end surface of the housing to close a valve bore in the housing and having inlet and outlet passages in registration with the inlet and outlet ports;

a solenoid winding bonded to the wall of the valve bore and defining a valve assembly receiving bore accessible from the surface; end surface, a removably mounted valve assembly placed within the valve assembly receiving bore removable therefrom at said end surface, said valve assembly including;

a magnetic circuit having a separate integrally connected pole piece assembly having a bore, said pole piece assembly being removable at said end surface;

a nonmagnetic valve stem and an annular magnetically permeable plunger slidably mounted on the valve stem, said valve stem and plunger defining a valve port for the controllable release of the pressurized fluid through the end plate outlet passage;

said valve stem and plunger being mounted in the pole piece assembly bore for removal therefrom at said end surface;

a seal on said valve stem adjacent the valve port and sealingly engaging the end plate;

spring means on the valve stem and mounted in the pole piece assembly bore to urge the plunger in sealing engagement with the seal and close the valve port;

said end plate being captured mounted to the housing to retain the valve assembly in the valve bore; and sealing means effective between the end plate and the housing to prevent escape of pressurized fluid in the valve.

28. A high strength watertight solenoid valve, connector and cable system for controlling high-pressure fluid-actuated devices underwater comprising:

a solenoid valve having a strong housing with inlet and outlet passages for the high pressure fluid at one end of the housing;

mounting means on said housing for connecting said one end thereof to a fluid-actuated device;

said housing having a connector bore at its other end;

electrical contacts in said connector bore;

an electrical connector having a body one end of which is adapted to be inserted in said bore;

fastening means for fastening said connector end in said bore;

sealing means for providing a watertight seal between said connector end and said bore;

said connector end having electrical contacts therein for engaging the contacts in said connector bore;

an electrical cable extending from the opposite end of said connector body;

said electrical cable having a multistranded high tensile strength cable extending along the axis thereof;

said connector body having anchoring means therein for mechanically securing an end of said high tensile strength cable; and a plurality of insulated electrical conductors helically wound around said high tensile strength cable, said conductors being attached to the electrical contacts in said connector end.

REEXAMINATION CERTIFICATE (520th)
United States Patent [19]
Chelminski et al.

[11] B1 3,588,039
[45] Certificate Issued Jun. 24, 1986

[54] SOLENOID VALVE STRUCTURES AND SYSTEMS

[75] Inventors: Stephen V. Chelminski, West Redding; Anthony J. Delano, Westport, both of Conn.

[73] Assignee: Bolt Associates, Inc., Norwalk, Conn.

Reexamination Request:
No. 90/000,374, May 5, 1983

Reexamination Certificate for:
Patent No.: 3,588,039
Issued: Jun. 28, 1971
Appl. No.: 855,667
Filed: Sep. 5, 1969

[51] Int. Cl.⁴ ............................................. F16K 31/06
[52] U.S. Cl. ................................. 251/141; 251/129; 335/261; 335/278; 335/279; 339/104
[58] Field of Search ................. 251/141, 129; 335/261, 335/278, 279; 339/104

[56] References Cited
U.S. PATENT DOCUMENTS

| | | | |
|---|---|---|---|
| 1,689,574 | 10/1928 | Williams. | |
| 2,279,341 | 4/1942 | Powell | 240/2 |
| 2,394,103 | 2/1946 | Rader | 175/338 |
| 2,760,175 | 8/1956 | Dunn | 339/94 |
| 2,910,089 | 10/1959 | Yarber | 251/129 X |
| 3,116,361 | 12/1963 | Bentz et al. | 174/88 |
| 3,140,073 | 7/1964 | Finck, Jr. | 251/129 |
| 3,166,692 | 1/1965 | Forrester et al. | 335/251 |
| 3,241,005 | 3/1966 | Morris | 317/191 |
| 3,245,266 | 4/1966 | Masters | 73/407 |
| 3,249,177 | 5/1966 | Chelminski | 181/0.5 |
| 3,285,285 | 11/1966 | Bielefeld | 137/625.65 |
| 3,368,789 | 2/1968 | Martin | 251/141 |
| 3,379,273 | 4/1968 | Chelminski | 181/0.5 |
| 3,448,960 | 6/1969 | Medley | 251/129 |
| 3,598,360 | 8/1971 | Merriner | 251/141 |
| 3,613,048 | 10/1971 | Brundza | 339/89 |

FOREIGN PATENT DOCUMENTS

547272 8/1942 United Kingdom ................ 251/129

OTHER PUBLICATIONS

Automatic Switch Co. (ASCO), Valve Catalog No. 202, Pertinent Pages, cover and pp. 4 and 5.

*Primary Examiner*—Arnold Rosenthal

[57] ABSTRACT

High performance, reliable solenoid valve structures and systems are described suitable for industrial uses and for use in a corrosive environment to control the flow of high pressure air from an inlet port to an outlet port. These solenoid valve structures are capable of withstanding high vibrational forces and certain embodiments of being submerged in salt water, having an all stainless steel magnetic circuit. The solenoid valve structures include a plunger which together with a valve stem defines the valve, the plunger being selectively shaped to establish excellent pressure balance, for high performance reliability of the magnetic circuit, while the plunger and associated operating parts can be quickly and conveniently disassembled and reassembled without injury to the solenoid valve, to remove dirt particles if any should inadvertently enter through the air line. The solenoid coil and connections may be totally encased. A high strength electrical cable and watertight connection system may be employed with the valve structures adapted to be submerged.

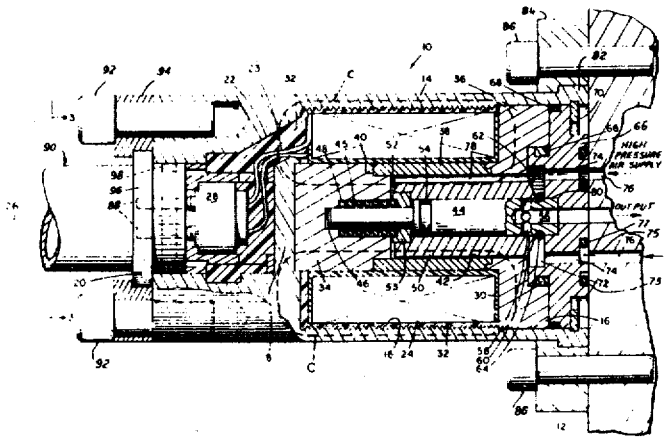

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9-12, 16 and 24-26 is confirmed.

Claims 1-8, 13-15, 17-23 and 28 are cancelled.

Claim 27 is determined to be patentable as amended.

27. A solenoid controlled valve for use in controlling high pressure *gaseous* fluid in a corrosive environment to control the flow of the pressurized *gaseous* fluid supplied to an inlet port to be abruptly released through an outlet port comprising:
- a housing formed of a corrosion resistant material and having a removably mounted end plate located at an end surface of the housing to close a valve bore in the housing and having inlet and outlet passages in registration with the inlet and outlet ports;
- a solenoid winding bonded to the wall of the valve bore and defining a valve assembly receiving bore accessible from [the surface; end surface] *the end surface*,
- a removably mounted valve assembly placed within the valve assembly receiving bore removable therefrom at said end surface, said valve assembly including;
- a magnetic circuit having a separate integrally connected pole piece assembly having a bore, said pole piece assembly being removable at said end surface;
- a nonmagnetic valve stem and an annular magnetically permeable plunger slidably mounted on the valve stem, said valve stem and plunger defining a valve port for the controllable release of the pressurized *gaseous* fluid through the end plate outlet passage;
- said valve stem and plunger being mounted in the pole piece assembly bore for removal therefrom at said end surface;
- a seal on said valve stem adjacent the valve port and sealingly engaging the end plate;
- spring means on the valve stem and mounted in the pole piece assembly bore to urge the plunger in sealing engagement with the seal and close the valve port;
- said end plate being captured mounted to the housing to retain the valve assembly in the valve bore; and
- sealing means effective between the end plate and the housing to prevent escape of pressurized *gaseous* fluid in the valve.

* * * * *